United States Patent

Prince

[15] 3,635,108
[45] Jan. 18, 1972

[54] LASER-GUIDED BORING TOOL FOR DEEP HOLE BORING

[72] Inventor: Thomas E. Prince, Louisville, Ky.
[73] Assignee: The United States of America as represented by the Secretary of the Navy
[22] Filed: Mar. 9, 1970
[21] Appl. No.: 17,834

[52] U.S. Cl................................82/1, 408/59, 33/46 AT
[51] Int. Cl......................................................B23b 39/00
[58] Field of Search........................82/1; 33/46 AT; 408/59

[56] References Cited

UNITED STATES PATENTS 3,287,998  11/1966  Goernert et al..........................408/59
3,517,966  6/1970   Montacie.................................33/46.2

Primary Examiner—Leonidas Vlachos
Attorney—R. S. Sciascia, H. H. Losche and Paul S. Collignon

[57] ABSTRACT

A boring tool is provided with a centering detector onto which a laser beam is directed. Deviation of the boring tool is detected and fed to a control unit and servo device which operates a pair of pusher pads to direct the boring tool back onto center. The boring tool is particularly adaptable for boring deep holes such as in large gun barrels.

3 Claims, 3 Drawing Figures

PATENTED JAN 18 1972

3,635,108

INVENTOR.
THOMAS E. PRINCE

BY H. H. Losche
Paul S. Collignon
ATTORNEYS

LASER-GUIDED BORING TOOL FOR DEEP HOLE BORING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a laser-guided boring tool and more particularly to a tool for boring deep holes, such as in large gun barrels.

Traditionally, in the boring of gun barrels, a so-called "-pack-bit" has been used for maintaining the straightness of the bore. This method can be visualized by imagining a cutter head, followed by a series of guidance rings. These rings are a few thousandths of an inch smaller than the bored hole. As the boring proceeds, these rings keep the boring head approximately aligned with the previously bored section of the hole. However, without an active guidance system, an accumulation of small errors allows the cutter head to slowly drift away from, or around, the center of rotation. When this drift exceeds a certain amount, straightening steps in the manufacturing process are required, adding to the cost of the gun barrel.

Various devices have been employed to assist in boring a straight hole. For example, in U.S. Pat. No. 3,321,248, which issued May 23, 1967, to Thomas N. Williamson et al., there is disclosed a guidance device for a tunneling machine. The guidance device is comprised of a laser beam projector and a pair of targets which are fixed on the tunneling machine. The projector directs laser beam onto the targets and the images of the beam on the two targets are simultaneously visible to the operator who then changes the direction of travel of the tunneling machine.

SUMMARY OF THE INVENTION

The present invention relates to a laser-guided boring tool for boring deep holes, such as the inside of large gun barrels. A long hollow boring bar is provided with a cutter head and a centering detector is attached to the aft side of the cutter head. A laser beam is projected through the hollow boring bar onto the centering detector and information from the centering detector is fed to a control unit to direct a pair of pusher pads on the boring bar to direct the cutter head in a straight path.

It is therefore a general object of the present invention to provide a boring device which will automatically correct for error in the direction of travel of a cutter head.

DESCRIPTION OF THE PREFERRED EMBODIMENT

Figure 1:
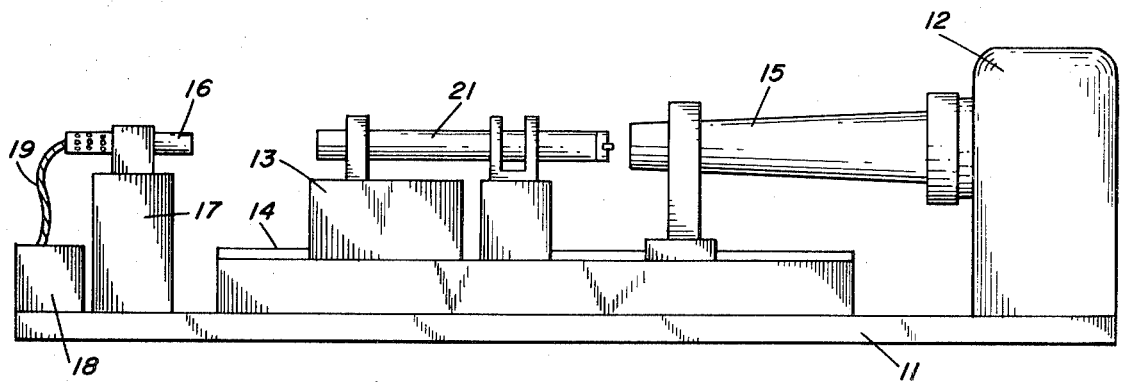
FIG. 1 is a side view of a preferred embodiment of the invention shown attached to a lathe for boring gun barrels.

Referring to the drawing, there is shown a gun barrel boring lathe having a bed 11, headstock 12, and a carriage 13 which is slidably mounted on ways 14. As best shown in FIG. 1 of the drawing, a gun barrel forging 15 is mounted in the boring lathe and is rotated by headstock 12. A laser 16 is mounted to stand 17 which is attached to bed 11 and laser 16 is electrically connected to a power supply 18 which also can be attached to bed 11. By way of example, laser 16 might be Model 5,600 Tooling Laser which is produced by Perkin-Elmer, Wilton, Connecticut, and power supply 18 might be Perkin-Elmer Model 5,204 Power Supply. Model 5,600 Tooling Laser is a hot cathode DC-excited Helium-Neon laser with a continuous output of 1.3 milliwatts in the fundamental transverse mode. The output from the laser is passed through a 5 X collimator to produce an output beam that is 10 mm. in diameter and collimated to the diffraction limit. Model 5,204 Power Supply generates the necessary voltages to operate laser 16, through an interconnecting laser 19.

Figure 2:
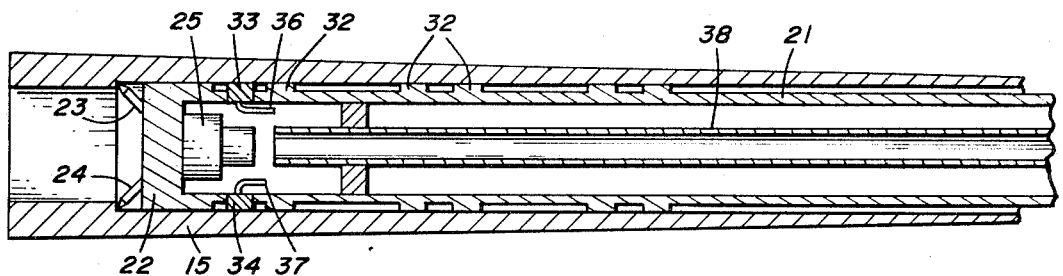
FIG. 2 is a longitudinal sectional view through a gun barrel showing a boring tool and guidance device of the present invention.
Figure 3:
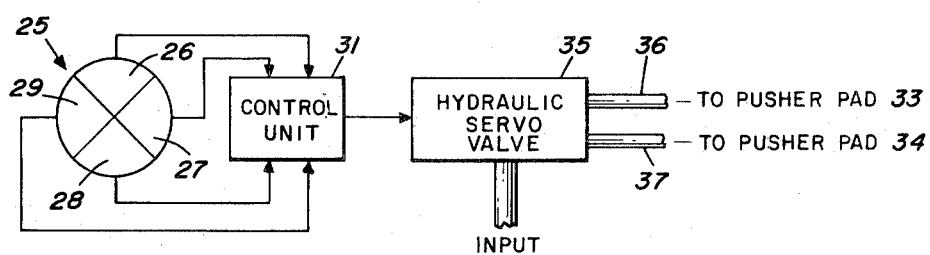
FIG. 3 is a diagrammatic view showing a centering detector and control system.

Referring now to FIGS. 1 and 2 of the drawing, a hollow boring bar 21 is supported on carriage 13 and a cutter head 22 is provided on the forward end of boring bar 21. Cutting tools 23 and 24 are attached to cutter head 22 and are shown removing metal from the gun barrel forging 15. A centering detector 25 is attached to the back side of cutter head 22 and is positioned to sense the centroid of the energy of a laser beam emitted by laser 16. As shown in FIG. 3 of the drawing, and by way of example, centering detector 25 might be Perkin-Elmer Model CD-1 Centering Detector. A quadrature array of detectors 26, 27, 28, and 29 are provided, with opposite detectors being wired in a bridge circuit to form a basic sensor. The differential signals generated by each pair of detectors are amplified and fed to an appropriate control unit to provide "X" and "Y" readouts.

A plurality of guidance rings 32 are provided on boring bar 21 and the outer diameter of rings 32 are few thousandths of an inch smaller than the bore being machined by cutting tools 23 and 24. A pair of pusher pads 33 and 34 are provided on bore bar 21 and re actuated by hydraulic servo valve 35 through hydraulic lines 36 and 37, respectively. The use of hydraulic servo vales are actuated by hydraulic servo valve 35 through hydraulic lines 36 and 37, respectively. The use of hydraulic servo valves and hydraulic lines to provide a mechanical output, that is, to actuate pads 33 and 34 are well known in the art. For example, in the text, *Control Systems Engineering*, by Gille, Pelegrin and De Caulne, McGraw-Hill Book Co., Inc. (1959), chapter 32, entitled "Hydraulic Servomotors," describes and shows various hydraulic motors, valves, and control devices for use in hydraulic systems. As various cutting fluid lines, electrical cables and hydraulic lines pass through hollow boring bar 21, a hollow tube 38 is provided inside boring bar 21 to provide a clear passageway for the laser beam emitted by laser 16.

OPERATION

After the gun barrel forging is mounted and aligned in headstock 12 of the boring lathe, a relative positioning of laser 16 and centering detector 25 is made so that there is a null from detector 25. Assuming now, for purpose of illustration, that cutter head 22 starts drifting downwardly, the laser beam from laser 16 will move up into quadrature 26. The amount of light in quadrature 26 increases and the amount of light in quadrature 28 decreases. Since the output current of centering detector 25 is proportional to the amount of light hitting the surface of detector 25, a small current (error voltage) is generated. This error signal is filtered, amplified and then used to drive hydraulic servo valve 35. Servo valve 35 drives pusher pads 33 and 34 which move cutter head 22 back toward the laser beam reference line to a null condition for detector 25.

I claim:

1. A guided boring device for deep hole boring comprising,
    a tubular boring bar having a cutter head on the forward end thereof,
    a centering detector having a quadrature array of detectors attached to the aft side of said cutter head, said centering detector providing an electrical output proportional to the direction and amount of movement of said cutter head from a centered position,
    a laser for projecting a laser beam onto said centering detector,
    pusher pad means attached to said tubular boring bar adjacent said cutter head and engageable with the surface of a hole being bored, and
    means connected to said electrical output of said centering detector for actuating said pusher pad means whereby said cutter head is returned to a centered position to provide a null condition on said centering detector.

2. A guided boring device for deep hole boring as set forth in claim 1 wherein said tubular boring bar has a plurality of guidance rings thereon, said guidance rings being slightly smaller in diameter than the diameter of a hole being bored.

3. A guided boring device for deep hole boring as set forth in claim 1 wherein said means comprises a control unit for operating a hydraulic valve adaptable for actuating said pusher pad means.

* * * * *

UNITED STATES PATENT OFFICE
CERTIFICATE OF CORRECTION

Patent No. 3,635,108　　　　　　　　Dated 1-18-72

Inventor(s) THOMAS E. PRINCE

UNDER RULE 322

It is certified that error appears in the above-identified patent and that said Letters Patent are hereby corrected as shown below:

Column 2, line 22

"appropriate control unit to provide"

should read

"appropriate control unit 31 to provide"

Column 2, line 27

"and re actuated"

should read and are actuated"

Column 2, lines 28 through 30

DELETE

"The use of hydraulic servo vales are actuated by hydraulic servo valve 35 through hydraulic lines 36 and 37, respectively."

Signed and sealed this 27th day of June 1972.

(SEAL)
Attest:

EDWARD M. FLETCHER, JR.　　　　ROBERT GOTTSCHALK
Attesting Officer　　　　　　　　Commissioner of Patents